Figure 1:
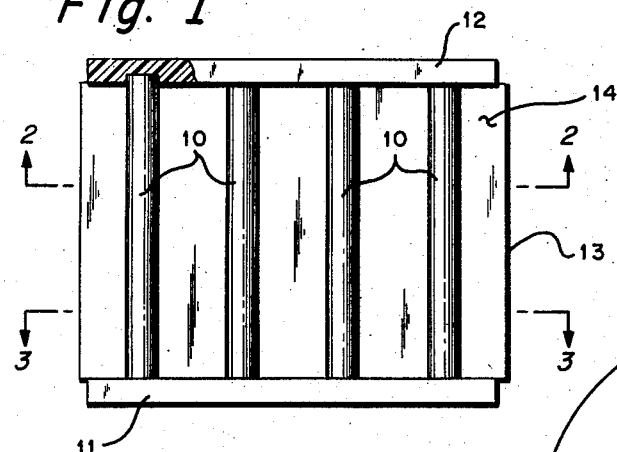

June 16, 1959     H. O. BENECKE     2,891,232

HYDROPHONE FOR DIRECTIONAL LISTENING BUOY

Filed June 28, 1955

INVENTOR.
HEINRICH O. BENECKE
BY
ATTORNEYS

United States Patent Office
2,891,232
Patented June 16, 1959

2,891,232

HYDROPHONE FOR DIRECTIONAL LISTENING BUOY

Heinrich O. Benecke, Doylestown, Pa.

Application June 28, 1955, Serial No. 518,698

7 Claims. (Cl. 340—9)

(Granted under Title 35, U.S. Code (1952), sec. 266)

The invention described herein may be manufactured and used by or for the Government of the United States of America for governmental purposes without the payment of any royalties thereon or therefor.

This invention relates to transducers, and more particularly to a directional hydrophone of small dimensions capable of detecting underwater sound so effectively that it is well suited for use in a listening buoy of restricted size.

In existing equipment for underwater search including the type known as listening buoys, transducers or hydrophones are incorporated as sound detectors for use in locating underwater targets which characteristically generate sounds capable of detection by this means.

The accuracy and range of transducers used as directional underwater sound detectors in such equipment is governed by a number of factors of which the attenuation of sound waves in water and the directivity of the equipment used are most important. Hence, both of these factors must be optimized within the practical restriction of limited given dimensions for the equipment. The range is adversely affected by attenuation of the sound waves in water which decreases with decreasing frequency, so that attenuation is minimized by the use of a low operating frequency. On the other hand, the directivity, which favorably affects the range, increases, for equipment of given dimensions, with increasing frequency, so that maximum directivity is achieved by the use of a high operating frequency. Moreover, accuracy of the equipment is enhanced by a narrow beam and hence by use of a high operating frequency to increase directivity, but the narrowest possible beam is not most desirable for the use indicated above, since the beam should be sufficiently wide to eliminate errors due to refraction and to provide a sufficient time on target for the sound sensitive beam as the portion of the equipment supporting the transducer is rotated through 360° about a vertical axis in the course of conventional operation of equipment incorporating directional sound detectors for underwater search. Thus, it is necessary in designing the device characterizing the instant invention to properly reconcile all of these factors in selecting the operating frequency to optimize the range and accuracy of this device.

With respect to the physical dimensions of the equipment, both range and accuracy have a tendency to increase with increased dimensions. However, the practical size of such equipment is narrowly restricted by the severe limitations as to space and weight characteristic of all airborne equipment. Consequently, the problem arises of making the best possible use of the limited space available by selecting the most effective arrangement of the sound sensitive elements included in the equipment. For example, the diameter of the standard launching tube installations presently used for launching listening buoys from aircraft dictates the maximum practical diameter for a rigid transducer assembly. In the past, attempts have been made to meet the practical operating requirements of transducers used as directional underwater sound detectors as well as the space limitations noted above by a construction which provided for transducer assemblies which would fold into a configuration fitting into the launching tube and would unfold after launching through the tube into an extended configuration of substantially larger overall dimensions to provide the desired directivity of about 30°. This expedient is subject to the disadvantages that the added mechanical structure necessary for articulation of the assembly to provide for extension of certain parts after water entry increases the possibility of mechanical failures and that the extended configuration impedes rotation of the assembly underwater at the same time it renders the transducer more subject to tilting caused by local currents which greatly reduces accuracy.

It is, therefore, an object of this invention to provide a transducer assembly giving the required directivity at a frequency providing maximum range within minimum overall dimensions.

It is another object of this invention to provide a non-collapsible transducer capable of fitting into the launching tubes of relatively small diameter currently in use.

It is still another object of this invention to provide a non-collapsible transducer having a horizontal directivity of about 30° and contained within the overall dimensions of former transducers in their collapsed non-operating configuration.

It is a further object of this invention to provide a transducer as stated above, which is of simplified construction and contains a minimum of relatively movable mechanical working parts.

It has been found that the above and other objects of this invention are accomplished by a transducer unit in which the transducer elements are spaced apart a distance equal to one-half the wave length of the transmitting frequency and are spaced a distance from a planar reflecting surface equal to one-fourth the wave length of the transmitting frequency.

Figure 2:
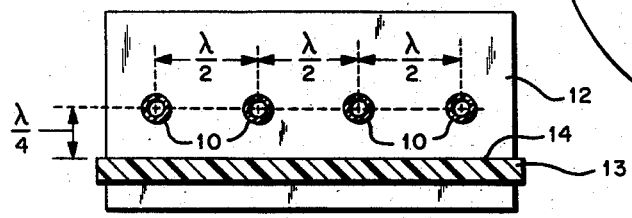
Figure 4:
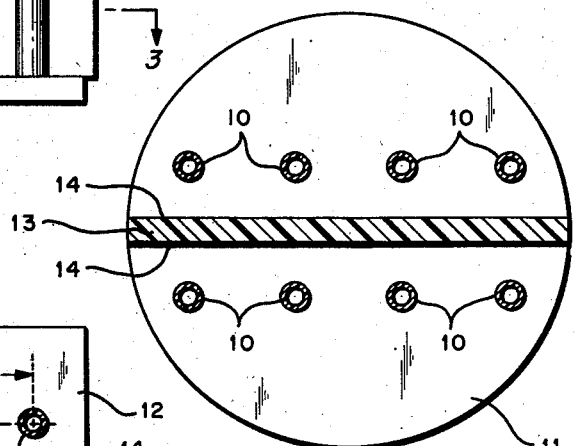
Figure 3:
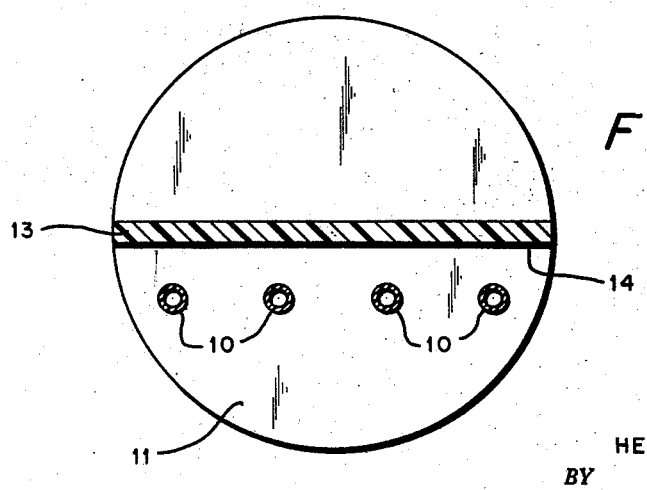

The invention is most readily understood by reference to the following description and the accompanying drawings hereby made a part of this application, and in which:

Fig. 1 is a front view of the preferred embodiment of the transducer of the instant invention, Fig. 2 is a horizontal cross-section taken on the line 2—2 of Fig. 1, Fig. 3 is a horizontal cross-section of a modification of this invention shaped to fit into a launching tube of given diameter, and Fig. 4 is a horizontal cross-section of another modification of this invention.

In the various figures, like reference numerals designate like or corresponding parts.

Referring first to Fig. 1, there is shown four transducer elements 10 embedded in supporting means consisting of base plate 11 and top plate 12. The transducer elements are preferably hollow tubes cylindrical in shape and in this instance are made of activated barium titanate-lead titanate ceramic. Their outer and inner surfaces are electroded with coatings of silver. They are constructed with one linear dimension large with respect to the other linear dimensions, and, accordingly, are referred to herein as linear transducers.

As shown in Fig. 2, the elongated cylindrical transducer elements 10 are spaced apart a distance of $$\frac{\lambda}{2}$$

measured between their centers where λ is the wavelength in water of the operating frequency. The transducer elements 10 are mounted parallel to each other in the same plane and have diameters such that their outer surfaces are spaced apart. A reflector 13 mounted between plates 11 and 12 provides a planar reflecting surface 14 located a distance $$\frac{\lambda}{4}$$

from the axes of the transducer elements. The reflector 13 is of a material having a specific impedance much less than that of water. A suitable material for the reflector is rubber having entrapped air enclosures therein.

In operation the transducer assembly illustrated in Figs. 1 and 2 is incorporated in conventional equipment for underwater search by aircraft, including, for example, a radio link and auxiliary orienting devices. In searching, the transducer assembly incorporated in such equipment is rotated about a vertical axis, usually through an arc of 360°.

The embodiment of Figs. 1 and 2 was made to operate at a frequency of about 15 kilocycles and was in fact constructed as part of a listening buoy having a circular cross-section, as shown in Fig. 3, to be launched from a launching tube having an inside diameter of 6⅞ inches. The operational frequency of 15 kilocycles employed in this modification was found to be practically optimum. The horizontal angle of the beam was between 25 and 30 degrees. It was found that the described spatial relationship between the transducer elements as respects each other and as respects the elements and the reflecting plane in terms of wave length gave results of range and accuracy equal to that given by much bulkier transducers of previously known types. Although the described modification includes four transducer elements, the principle of building space saving transducers taught herein is not restricted to this number.

Referring to Fig. 3, in this modification, the transducer assembly is shaped to fit inside a standard launching tube of specified diameter by making the base plate 11 and top plate 12 circular. As shown in Fig. 3, one-half of the area of the base plate 11 is unoccupied, while the four transducer elements 10 illustrated form a complete transducer assembly. This illustrates that the invention exceeds the objective of providing a transducer assembly within the dimensions of conventional transducer assemblies in that only one-half the space available within standard launching tubes is used. Consequently, the space saved can be utilized in several ways. For example, it may be used to accommodate a second transducer with identical performance characteristics in order to give additional information, as shown in Fig. 4.

The modification illustrated in Fig. 4 in a view corresponding to that in Fig. 3 includes two identical transducer assemblies mounted on opposite sides of the reflector 13 having two planar reflecting surfaces 14 and each including a plurality of transducer elements 10 arranged according to the critical spatial relationship specified above in describing the embodiment of the instant invention shown in Figs. 1 and 2 above. With two transducer assemblies mounted as shown in Fig. 4 so that they are opposed 180°, twice the number of informations per unit time may be obtained without recourse to increased rotational speed. Alternatively, the same number of informations per unit time may be obtained at half the rotational speed. Yet, the modification illustrated in Fig. 4 can still be accommodated within the space available in a standard launching tube.

It should be understood that the number of transducer elements included in the various embodiments of the instant invention is exemplary only and that the number of such elements may be varied as necessary under varying operating conditions or to satisfy different operating requirements. Likewise, the length of the transducer elements is determined by specific design requirements established to insure optimum results in various applications of the instant invention. Finally, the reflector 13 may consist of thin sheet material stretched taut between plates 11 and 12 to form planar reflecting surfaces 14.

The spatial relationship of the respective transducer elements within all of the disclosed modifications of this device was found to produce the highest efficiency with respect to range and accuracy when compared to any other arrangement within the same overall dimensions. Moreover, since the transducer assemblies of this invention need not be extended to greater overall dimensions after they are launched, they have a minimum of relatively moving parts subject to mechanical failures. Finally, the complete absence of protruding elements of the type found in prior devices used for directional underwater sound detectors permits rotation by application of a smaller torque and renders this invention less subject to the unbalanced forces imposed on such a device by water currents and waves.

Obviously, many modifications and variations of the present invention are possible in the light of the above teachings. It is, therefore, to be understood that within the scope of the appended claims the invention may be practiced otherwise than as specifically described.

What is claimed is:

1. An electro-acoustic sound receiver assembly comprising a plurality of sound receiver elements disposed parallel to each other in a common plane and spaced apart a distance equal to one-half the wavelength of a predetermined operating frequency, and a planar sound reflector disposed parallel to the common plane of said sound receiver elements at a distance equal to one-fourth the wavelength of the predetermined operating frequency.

2. An electro-acoustic underwater sound receiver assembly comprising a plurality of like elongated sound receiver elements disposed parallel to each other in a common plane and spaced apart a distance on centers equal to one-half the wavelength in water of a predetermined operating frequency, and a planar sound reflector disposed parallel to the common plane of said sound receiver elements and spaced therefrom a distance equal to one-fourth the wavelength in water of the predetermined operating frequency.

3. An electro-acoustic underwater sound receiver assembly comprising a plurality of elongated cylindrical sound receiver elements of substantially equal length, a first supporting means fixedly interconnecting the respective elements at one end, a second supporting means fixedly interconnecting the respective elements at the other end, said elements being arranged with their respective longitudinal axes disposed parallel to each other in a common plane and spaced apart a distance equal to one-half the wavelenth in water of a predetermined operating frequency, and a reflector member extending between and connected to said first and second supporting means, said reflector member having a planar sound reflecting surface disposed parallel to the common plane of the longitudinal axes of the respective sound receiving elements and spaced therefrom a distance equal to one-fourth the wavelength in water of the predetermined operating frequency.

4. An electro-acoustic transducer assembly for use underwater comprising a plurality of elongated cylindrical transducer elements of substantially equal length, a first supporting means fixedly interconnecting the respective transducer elements at one end, a second supporting means fixedly interconnecting the respective transducer elements at the other end, said transducer elements being arranged with their respective longitudinal axes disposed parallel to each other in a common plane and spaced apart a distance equal to one-half the wavelength in water of a predetermined operating frequency, and a reflector member extending between and connected to both said first and said second supporting means, said reflector member having a planar sound reflective surface of a low specific sound impedance disposed parallel to the common plane of the longitudinal axes of the respective transducer elements and spaced therefrom a distance equal to one-fourth the wavelength in water of the predetermined operating frequency.

5. An electro-acoustic transducer assembly for use underwater comprising a plurality of elongated cylindrical transducer elements of substantially equal length, a first flat circular supporting means fixedly interconnecting the respective transducer elements at one end, a second flat circular supporting means fixedly interconnecting the respective transducer elements at the other end, said transducer elements extending perpendicular to both of said supporting means with their respective longitudinal axes disposed parallel to each other in a common plane and spaced apart a distance equal to one-half the wavelength in water of a predetermined operating frequency, and a reflector member extending perpendicularly between and connected to both said first and said second supporting means, said reflector member having a planar sound reflective surface disposed parallel to the common plane of the longitudinal axes of the respective transducer elements and spaced therefrom a distance equal to one-fourth the wavelength in water of the predetermined operating frequency.

6. A device as described in claim 5, in which said reflector member is located diametrically of said first and second circular supporting means and has a second planar sound reflecting surface on its opposite side, and, in addition, a second equal plurality of elongated cylindrical transducer elements fixedly attached to said first and second supporting means on the other side of said reflector member, said second plurality of transducer elements extending perpendicular to both of said supporting means with their respective longitudinal axes disposed parallel to each other and spaced apart a distance equal to one-half the wavelength in water of the predetermined operating frequency in a second common plane disposed parallel to said second sound reflecting surface and spaced therefrom a distance equal to one-fourth the wavelength in water of the predetermined operating frequency.

7. In combination with transmitting, receiving and orienting apparatus therefor, an electro-acoustic transducer assembly for use underwater, comprising at least one set of four elongated cylindrical transducer elements of substantially equal length, a first supporting means fixedly interconnecting the respective transducer elements at one end thereof, a second supporting means fixedly interconnecting the respective transducer elements at the other end thereof, said transducer elements being arranged with their respective longitudinal central axes disposed parallel to each other in a common plane and spaced apart a distance equal to one-half the wavelength in water of a predetermined operating frequency, and a reflector member extending between and connected to both said first and said second supporting means, said reflector member having at least one planar sound reflective surface of a low specific sound impedance disposed parallel to the common plane of the longitudinal axes of the respective transducer elements and spaced therefrom a distance equal to one-fourth the wavelength in water of the predetermined operating frequency.

References Cited in the file of this patent
UNITED STATES PATENTS

| | | |
|---|---|---|
| 1,277,562 | Fessenden | Sept. 3, 1918 |
| 2,095,083 | Renatus | Oct. 5, 1937 |
| 2,313,513 | Brown | Mar. 9, 1943 |
| 2,511,689 | Beechlyn | June 13, 1950 |